Nov. 15, 1966
H. C. SWIFT
3,285,370
DISK BRAKES
Filed Oct. 28, 1964
2 Sheets-Sheet 1
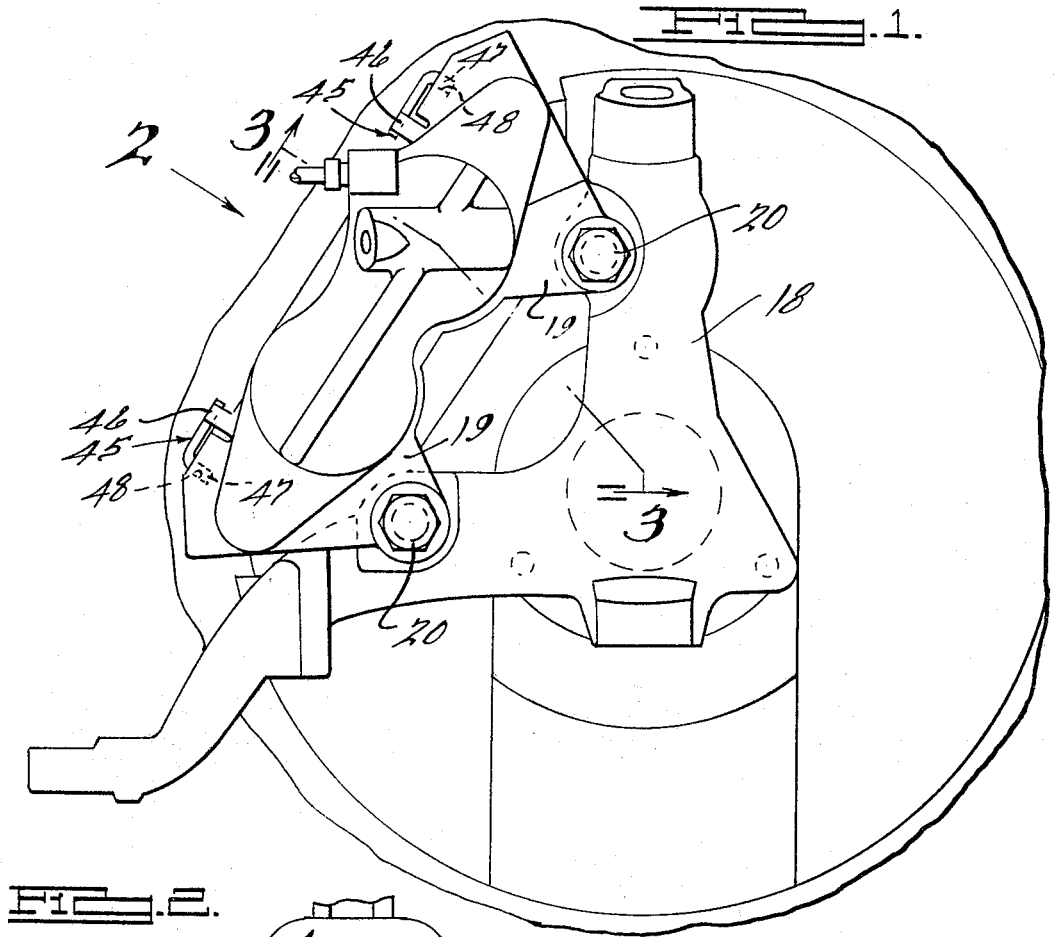
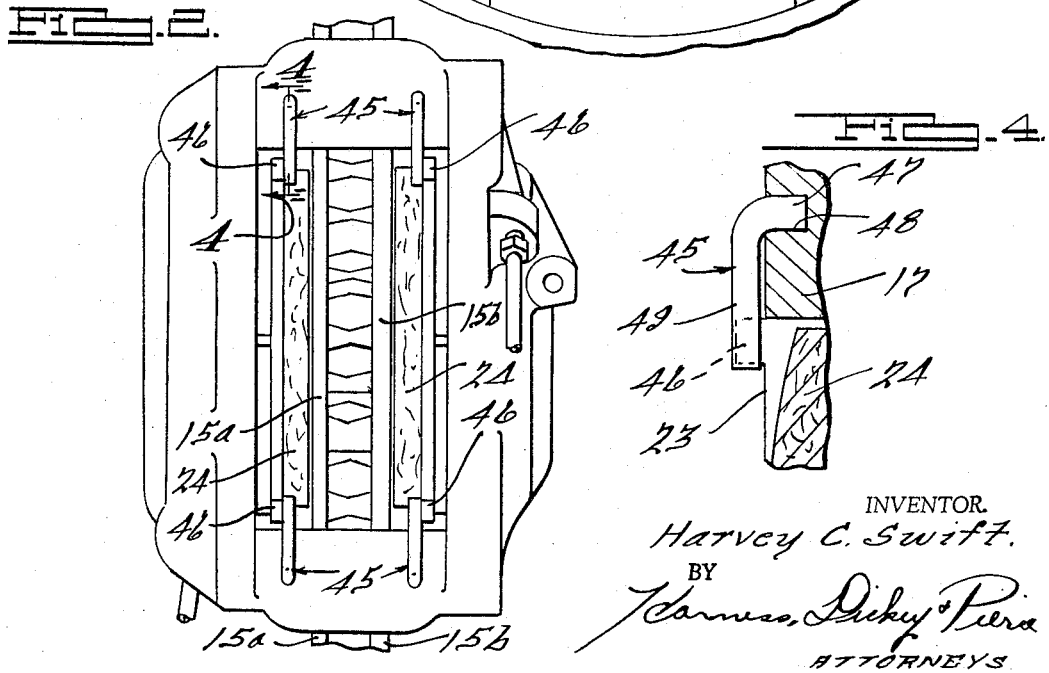
INVENTOR.
Harvey C. Swift.
BY
*Carnes, Dickey & Pierce*
ATTORNEYS Nov. 15, 1966 — H. C. SWIFT — 3,285,370
DISK BRAKES
Filed Oct. 28, 1964 — 2 Sheets-Sheet 2
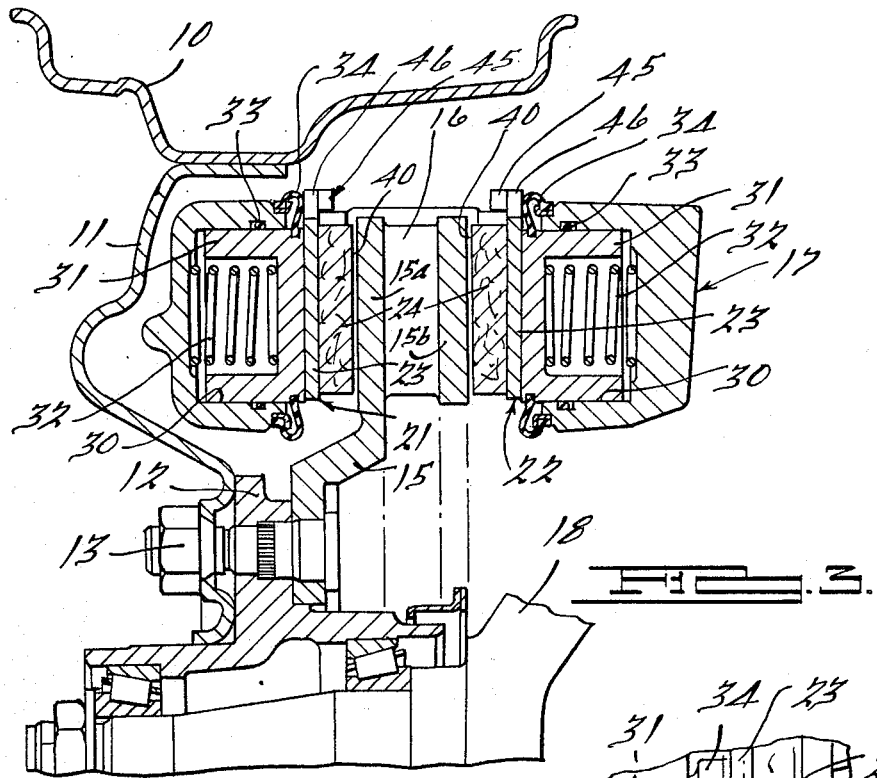
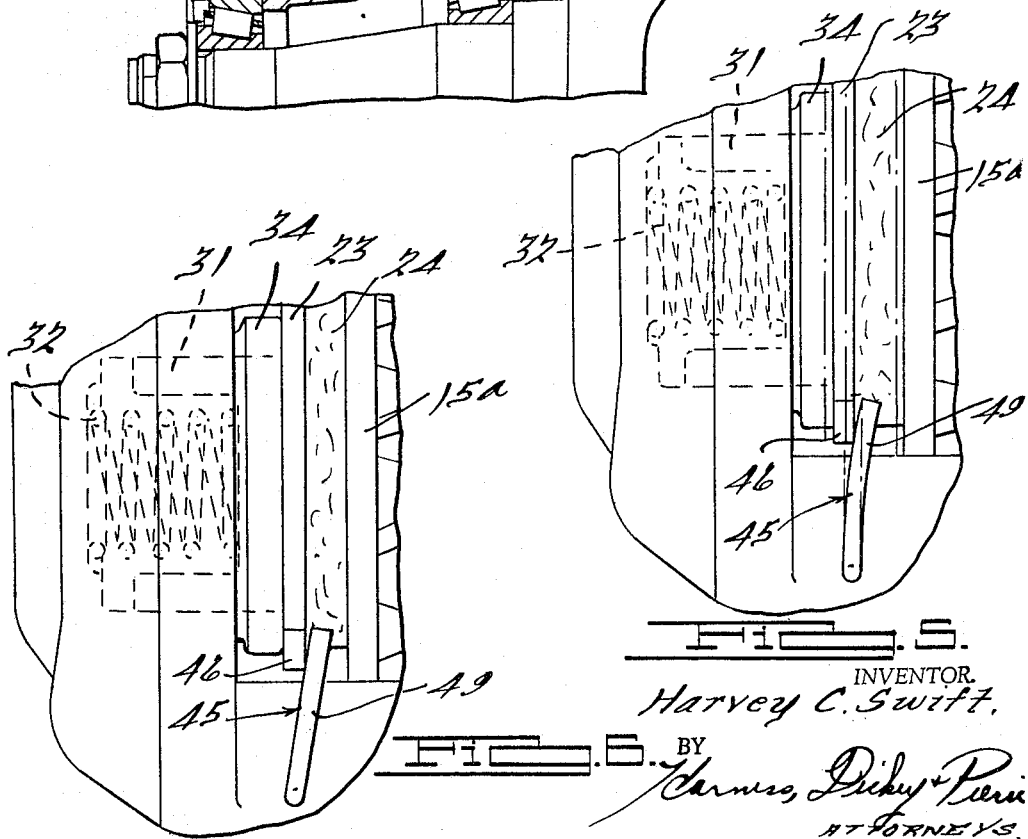
INVENTOR.
Harvey C. Swift,
BY
ATTORNEYS.

United States Patent Office 3,285,370
Patented Nov. 15, 1966

3,285,370
DISK BRAKES
Harvey C. Swift, Birmingham, Mich., assignor to Kelsey-Hayes Company, Romulus, Mich., a corporation of Delaware
Filed Oct. 28, 1964, Ser. No. 407,000
5 Claims. (Cl. 188—73)

This invention relates to wheel brakes for vehicles and, more particularly, to improvements in disk brakes providing means for properly positioning the brake shoes after each brake application.

One of the objects of this invention is to provide means for automatically positioning the brake shoe with respect to the brake disk after each brake application and irrespective of the extent of wear on the brake lining.

Another object of this invention is provide an automatic brake shoe positioning device of this character which is so reduced in the number and character of its component parts as to approach the ultimate in structural simplicity to thereby create an economy in its manufacture, installation and maintenance costs.

The above and other objects of the invention are attained by a construction involving one or more adjuster or positioning arms for each brake shoe. Each brake shoe actuating piston is spring biased into brake applying position and the adjuster or positioning arms are so arranged that each brake shoe is held in position with just the proper clearance between the brake lining and the brake disk when the brakes are released. These arms are sufficiently resilient so that they bend or deflect upon each application of the brakes sufficiently to permit the brake shoe to engage the brake disk but are sufficiently rigid to resist the movement of the brake shoe under the action of the springs which bias the brake shoe actuating pistons toward the brake disk. Each adjuster or positioning arm is rotatably mounted on the caliper in a friction pivot which will permit the arm to rotate when the brake shoe moves more than the normal distance due to wear on the brake lining so that when the brakes are release, the adjuster or positioning arm assumes a new position to again hold the brake shoe with the proper or desired clearance between the brake lining and the brake disk when the brakes are released.

The various objects and advantages, and the novel details of construction of one commercially practical embodiment of the invention, will become more apparent as this description proceeds, especially when considered in connection with the accompanying drawings, in which:

FIGURE 1 is an elevational view of a disk brake constructed in accordance with the invention looking from the inboard side of the wheel;

FIGURE 2 is an elevational view looking in the direction of arrow "2" in FIGURE 1;

FIGURE 3 is an enlarged fragmentary sectional view taken substantially on the plane indicated by line 3—3 in FIGURE 1;

FIGURE 4 is a detailed sectional view taken on line 4—4 in FIGURE 2;

FIGURE 5 is a fragmentary elevational view showing the positions of the adjuster or positioning arms when the brakes are applied; and FIGURE 6 is a similar view showing the position of the adjuster or positioning arms after these arms are adjusted due to wear on the brake lining.

The disk brake of this invention is shown as being associated with a vehicle having a rim 10 and a wheel body 11 secured to the axle flange 12 by means of studs or bolt and nut assemblies 13.

Also secured to the flange 12, as for instance by means of the same stud or bolt and nut assemblies 13, is a brake disk 15. In the form of the invention illustrated, the brake disk 15 is formed with a pair of spaced walls 15a and 15b. The brake disk is provided with a plurality of radially extending apertures provided by webs 16 extending between the spaced walls 15a and 15b. The webs 16 function as fan blades and serve to move cooling air in a radially outward direction between the walls 15a and 15b when the brake is rotated. This serves to reduce the heat generated by the engagement of the brake shoes with the brake disk, as will be apparent.

The reference character 17 indicates a caliper-like member which straddles a portion of the periphery of the brake disk 15 and is rigidly secured to an axle part 18 by means of ears or lugs 19 and attaching bolts 20.

Mounted in the caliper member 17 is one or more pairs of brake shoes 21 and 22, each comprising a backing plate 23 and a brake lining 24. The brake shoes 21 and 22 are slidably mounted on the caliper 17 for movement toward and away from the brake disk 15 by means not shown.

In the embodiment of the invention illustrated, the caliper member 17 is provided with two pairs of opposd cylinders 30 adapted to slidably receive brake actuating pistons 31. Each piston 31 is biased toward the associated brake shoe by means of a spring 32 so that these pistons normally urge the brake shoes toward engaging relation withe the brake disk 15.

Each piston is provided with an annular seal 33, which may be and preferably is, in the form of an O-ring. A flexible annular boot 34 formed of rubber, canvas, or other suitable flexible material, may be provided to close the clearance between each piston 31 and its cylinder 30 to exclude therefrom dust or other foreign material.

As stated heretofore, the present invention relates to means for properly positioning the brake shoes after each application of the brakes to provide the proper clearance between the brake linings 24 and the brake disk 15, as shown in an exaggerated manner at 40 in FIGURE 3. As stated heretofore, each brake shoe actuating piston 31 is biased into brake applying position by means of springs 32, so that the brake linings would normally frictionally engage the brake disk 15 unless some control means was provided for properly positioning the brake shoes when the brakes are released.

For accomplishing this, the brake is provided with a plurality of positioning or adjusting arms or levers 45. Preferably two adjusting or positioning arms 45 are provided for each brake shoe. These adjusting or positioning arms 45 are adapted to engage upstanding projections or lugs 46 carried by or formed on the backing plates 23 of the brake shoes 21 and 22. Each arm 45 is provided with a laterally extending hub portion 47 which pivotally and frictionally engages a recess or socket 48 formed in an adjacent portion of the caliper 17. The connection 47—48 is such that the arms 45 will normally be held against rotation relative to the caliper 17, but, when the brake shoes 21 and 22 partake of excessive movement due to wear on the brake linings 24, the arm 45 will be rotated in its socket so as to take up a new position with reference to the brake shoe, commensurate with the amount of wear on the brake lining. This movement is suggested in FIGURE 6, wherein the arm 45 has been adjusted in the direction of the arrow because of excessive movement of the brake shoe due to wear on the lining thereof.

The body portion 49 of each arm 45 is sufficiently longitudinally flexible to bend or flex, as indicated in FIGURE 5, to permit normal operation of the brakes without rotating in its socket 48. This is suggested in FIGURE 5, in which the brake shoe has moved from the dot and dash line position to the full line position.

When, however, the brake lining has become worn, as indicated in FIGURE 6, the excessive movement of the brake shoe will rotate the arm 45 in its socket 48 and the arm 45 will then take up a new position to hold and properly position the brake shoe with respect to the brake disk 15 to provide the desired or preferred clearance therebetween.

It will be understood that, inasmuch as the pistons 31 are normally biased toward the brake disk 15, they will serve to hold the lugs or ears 46 in engagement with the arms 45.

The construction just described, including the spring biased brake actuating pistons and brake shoes, and the positioning arms 45, always holds the brake shoes properly spaced from the brake disk and returns the shoes to this position after each brake application, and thus minimizes the possibility of pad knock-off which might be caused by many things, including a blow to the wheel and consequently the brake disk.

As will be apparent from the foregoing description, the objects and advantages of this invention are attained by a construction which is so reduced in the number and character of its component parts as to approach the ultimate in structural simplicity. The simplicity of the device creates an economy in its manufacture, installation and maintenance costs.

While one commercially practical embodiment of the invention has been described and illustrated herein somewhat in detail, it will be understood that various changes may be made as may come within the purview of the accompanying claims.

What is claimed is:

1. In a disk brake for wheels having a brake disk rotatable with the wheel, a caliper-like member secured to a stationary part of the wheel axle, a brake shoe carried by said caliper-like member, and a spring-biased brake actuating piston supported by said caliper-like member, that improvement which comprises, a brake shoe positioning arm carried by said caliper-like member and abuttable by but not positively fixed to said brake shoe to provide an abutment against which said brake shoe is normally held by said piston, said arm having an adjustable connection with said caliper-like member whereby excessive movement of said brake shoe due to wear on the brake lining will adjust said arm to a new position to maintain a desired normal position of the brake shoe with respect to said brake disk when the brakes are released and said arm will absorb at least a part of the spring biased force of said piston in the released condition of the brakes.

2. A device as described in claim 1 in which said positioning arm comprises an elongated portion adapted to engage the brake shoe, said elongated portion being sufficiently flexible to bend longitudinally during the normal operation of the brakes, a round laterally extending portion on one end of said arm adapted to pivotally and frictionally engage a similar shaped socket in said caliper-like member to pivotally mount said arm on said caliper-like member whereby excessive movement of said brake shoe due to wear on the lining thereof will adjust said arm about its pivot to a new position with respect to said brake shoe.

3. In a disk brake for wheels having a brake disk rotatable with the wheel, a caliper-like member secured to a stationary part of the wheel axle, a brake shoe mounted on said caliper-like member comprising a backing plate and a brake lining, and a spring-biased brake actuating piston carried by said caliper-like member, that improvement which comprises, a brake shoe adjuster comprising an arm abuttable by but not fixed to said backing plate to provide an abutment against which said brake shoe is normally held by said piston, a friction pivot connecting one end of said arm to said caliper-like member, said arm being sufficiently flexible to longitudinally flex during normal operation of the brake shoe, said friction pivot permitting adjustment of said arm to a new position with respect to said brake shoe upon excessive movement of the brake shoe due to wear on the lining thereof and said arm being operable to absorb at least a part of the spring biased force of said piston in the released condition of the brakes.

4. A device as described in claim 3 in which said arm is provided with a laterally extending round portion frictionally engaging a correspondingly shaped aperture in said caliper-like member.

5. In a disk brake for wheels having a brake disk rotatable with the wheel, a caliper-like member secured to a stationary part of the wheel axle, a brake shoe mounted on said caliper-like member comprising a backing plate and a brake lining, and a spring for normally biasing said brake actuating piston and brake shoe toward said brake disk, that improvement which comprises, a brake shoe positioning means comprising an arm abuttable by but not fixed to said backing plate to form an abutment against which said backing plate is normally held when the brakes are released, said arm being sufficiently longitudinally flexible to bend and permit normal operation of the brakes, and a laterally extending round portion on one end of said arm, and a similarly shaped recess in said caliper-like member to pivotally receive said round portion and to frictionally engage the same, whereby said arm may be pivotally moved to a new position with respect to said brake shoe upon excessive movement of the brake shoe due to wear on the brake lining and whereby said arm is operable to absorb at least a part of the spring biased force of said piston in the released condition of the brakes.

References Cited by the Examiner

UNITED STATES PATENTS

| 2,973,837 | 3/1961 | Wilson | 188—73 |
| 2,981,376 | 4/1961 | Zeidler | 188—73 |
| 3,110,364 | 11/1963 | Butler | 188—73 |

FOREIGN PATENTS

| 1,130,310 | 5/1962 | Germany. |
| 939,427 | 10/1963 | Great Britain. |

MILTON BUCHLER, *Primary Examiner.*

G. E. A. HALVOSA, *Assistant Examiner.*